(No Model.)
C. A. SHEAFE.
FISHING ROD HOLDER.
No. 440,727. Patented Nov. 18, 1890.
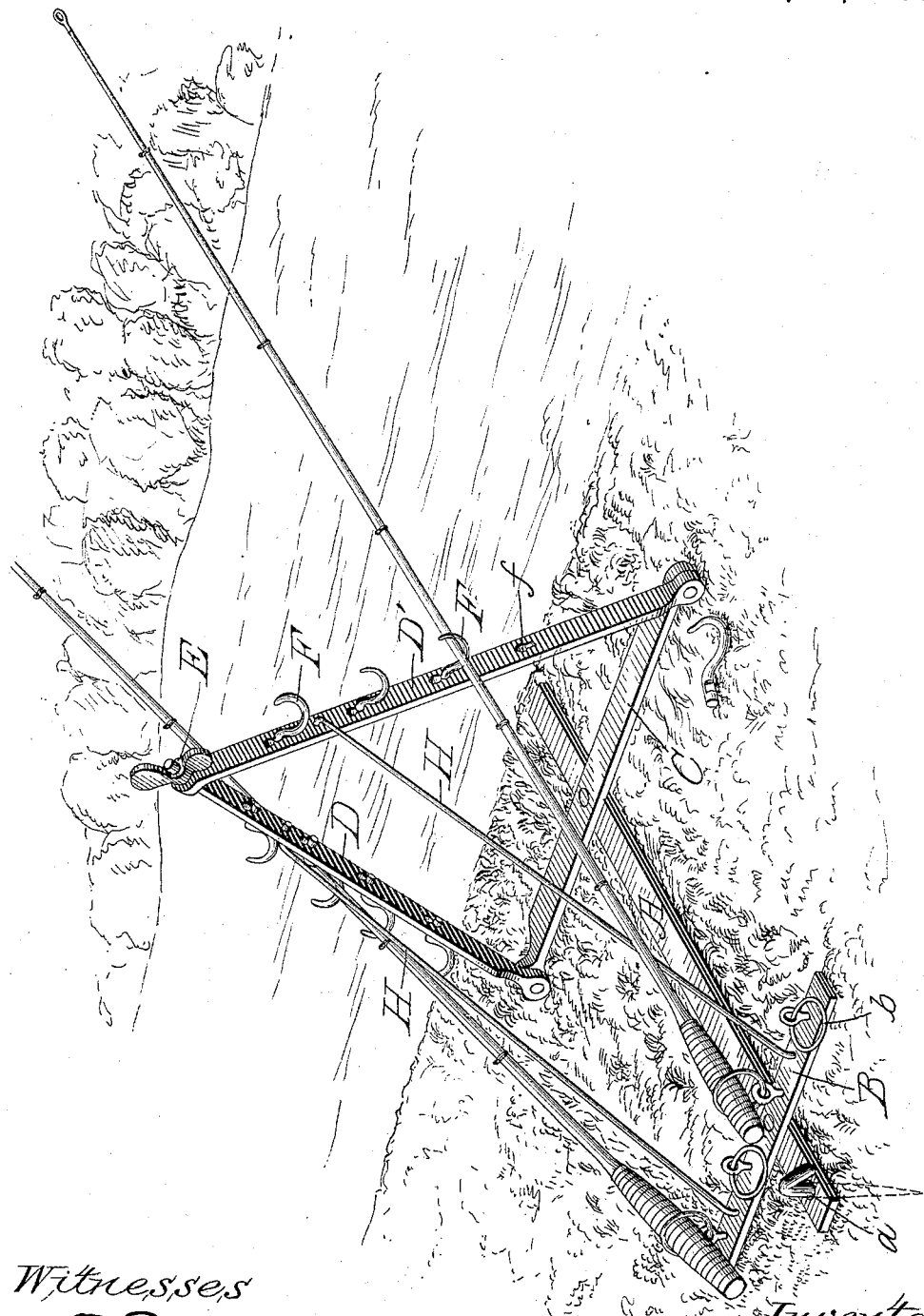

UNITED STATES PATENT OFFICE.

CHARLES A. SHEAFE, OF MURFREESBOROUGH, TENNESSEE.

FISHING-ROD HOLDER.

SPECIFICATION forming part of Letters Patent No. 440,727, dated November 18, 1890.

Application filed July 10, 1890. Serial No. 358,297. (No model.)

*To all whom it may concern:*

Be it known that I, CHARLES A. SHEAFE, a citizen of the United States, residing at Murfreesborough, in the county of Rutherford and State of Tennessee, have invented certain new and useful Improvements in Fishing-Rod Holders; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention relates to fishing-rod holders; and it consists in certain improvements in the construction and combination of parts, as hereinafter set forth and claimed.

The accompanying drawing shows a perspective view of my invention as it appears when set up for use.

A represents the base-bar, upon which are pivoted at either end the butt-bar B and arm-bar C. To the butt-bar B are attached four or more rings $b$, adapted to receive the butts of the fishing-rods. To the ends of the arm-bar C are pivoted two arms D D', each provided with four or more slots $f$, similar in shape to the ordinary form of key-holes and adapted to receive the supporting-hooks F. The outer end of the arm D is threaded and adapted to pass through a suitable hole in the arm D', so that the two parts may be clamped together by the thumb-screw E.

The shank of each of the supporting-hooks F has a flattened end terminating in a knob, and the hooks are attached to the arms by passing the knob through the upper end of the slot and then slipping the flattened part or neck of the shank down into the narrow end of the slot.

The arms D D' are connected with the butt-bar B by two connecting rods or braces H, having hooked ends which enter corresponding holes in the arms and butt-bar.

In order to hold the device securely when in use, the inner end of the base-bar A is provided with a hole $a$, through which a spike may be driven into the ground.

In using the holder the butt of the fishing-rod is inserted through one of the rings $b$ and the upper portion of the rod rested in one of the hooks F, the elevation and angle at which the rod is held being regulated by the hook and ring used.

When the holder is not in use, the thumb-screw E, braces H, and hooks F can be easily and quickly detached and the bars and arms folded together and the whole conveniently packed in a case for transportation.

Having fully described my invention, what I claim, and desire to secure by Letters Patent, is—

A fishing-rod holder consisting of a base-bar A, having pivoted to it at one end a butt-bar B, provided with rings $b$, and at the other end an arm-bar C, to the ends of which are pivoted two arms D D', each provided with slots $f$, adapted to receive the rod-supporting hooks F, the outer end of one arm being threaded and adapted to pass through a suitable hole in the other arm, so that the two arms may be clamped together by a thumb-screw E.

In testimony whereof I affix my signature in presence of two witnesses.

CHARLES A. SHEAFE.

Witnesses:
P. P. MASON,
FREDERIC H. CRASS.